March 17, 1970 A. N. WRIGHT 3,501,353
METHOD OF INHIBITING OXYGEN UPTAKE AND
PRODUCTS FORMED THEREBY
Filed Dec. 27, 1966 2 Sheets-Sheet 1

Inventor:
Archibald N. Wright,
by Paul R. Webb, II
His Attorney.

March 17, 1970  A. N. WRIGHT  3,501,353
METHOD OF INHIBITING OXYGEN UPTAKE AND
PRODUCTS FORMED THEREBY
Filed Dec. 27, 1966  2 Sheets-Sheet 2
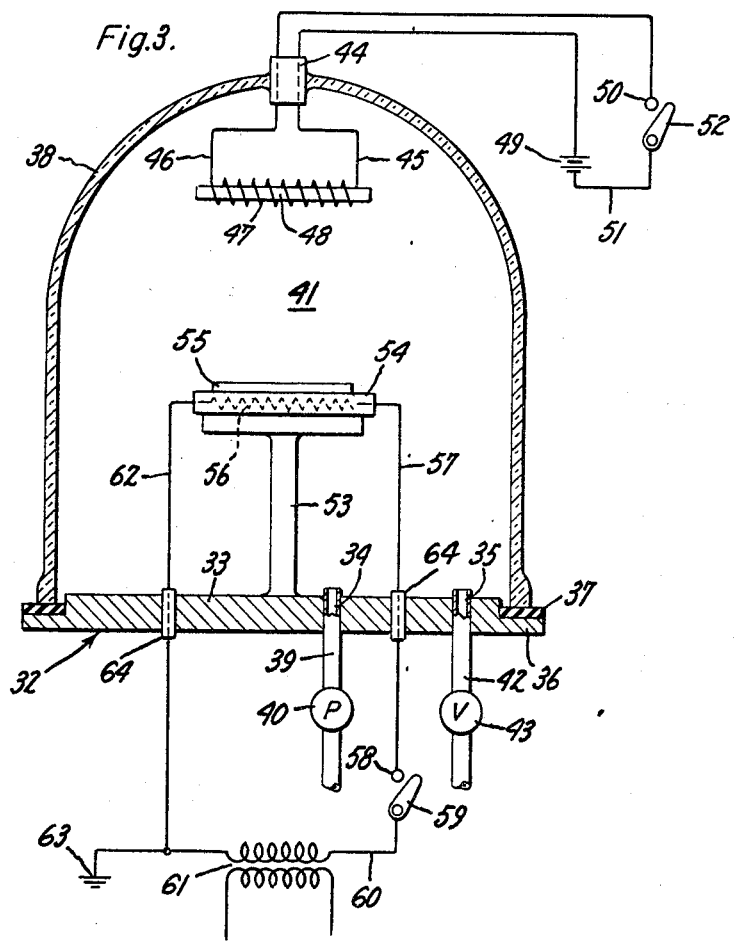
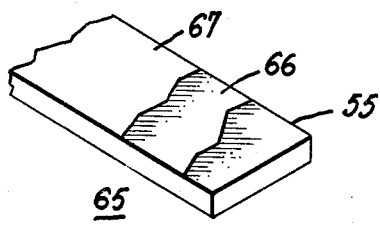
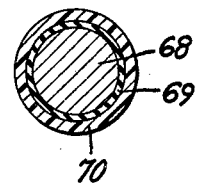
Inventor:
Archibald N. Wright,
by Paul R. Webb, II
His Attorney.

United States Patent Office 3,501,353
Patented Mar. 17, 1970

3,501,353
METHOD OF INHIBITING OXYGEN UPTAKE AND PRODUCTS FORMED THEREBY
Archibald N. Wright, Schenectady, N.Y., assignor to General Electric Company, a corporation of New York
Filed Dec. 27, 1966, Ser. No. 604,800
Int. Cl. C23f 7/00
U.S. Cl. 148—6.14
9 Claims

ABSTRACT OF THE DISCLOSURE

A product has a clean copper surface, and an oxidation inhibiting layer thereon. The oxidation inhibiting layer is formed from a fluid which has a high heat of absorption and which is not subject to auto-oxidation. Such fluids include nitrosyl chloride, nitropropane and nitrosobenzene. A method of forming such a layer comprises contacting under vacuum conditions a clean copper surface with a gaseous medium of the above type.

---

This invention relates to methods of inhibiting oxygen uptake and products formed thereby and, more particularly to methods of inhibiting oxygen uptake of clean copper surfaces and products including such oxygen uptake inhibited clean copper surfaces.

Oxygen uptake at 25° C. in relation to a clean copper surface is composed of an initial instantaneous oxygen uptake and a subsequent continuous oxygen uptake or oxidation. The initial uptake is generally in the order of 25 percent and probably molecular oxygen. The subsequent uptake is oxidation which proceeds after a brief induction period of about three minutes following the initial uptake.

The present invention is directed to methods of inhibiting oxygen uptake and products formed thereby. The present method relates to inhibiting both initial instantaneous oxygen uptake and the subsequent continuous oxygen uptake or oxidation of clean copper surfaces. Further, the invention relates to methods of forming an oxidation inhibiting layer on such surfaces and preventing degradation at elevated temperatures of polymeric material adhering to such surfaces. Additionally, the invention relates to forming products which include a clean copper surface with an oxidation inhibiting layer thereon. The method of the present invention results in an improved product by contacting a clean copper surface with a liquid or under vacuum conditions with a gas having a high heat of absorption and not subject to auto-oxidation whereby an oxidation inhibiting layer is formed on such surfaces. The improved product of the present invention has a clean copper surface with an oxidation inhibiting layer thereon.

Clean copper surfaces are necessary in a wide variety of applications including electronic circuitry, superconducting contacts, electrically conductive wire, ornamental material, and solderable material. However, the subsequent continuous oxygen uptake or oxidation of such a reactive surface of copper results in oxide formation thereon. When a conventional electrically insulated wire which has a copper core with an insulated layer thereon, for example, a polymeric enamel, is subjected to elevated temperatures, oxidation of the copper core occurs with a subsequent breakdown of adhesion between the enamel and the copper core and a degradation of the enamel. Thus, it would be desirable to provide a method of inhibiting the oxygen uptake of copper surfaces. Further, it would be advantageous to form products having an oxidation inhibiting layer.

It is an object of my invention to provide an improved method of inhibiting oxygen uptake of a clean copper surface.

It it another object of my invention to provide an improved method of forming an oxidation inhibiting layer on a clean copper surface.

It is a further object of my invention to provide an improved method of preventing degradation of polymeric material adhering to a clean copper surface.

It is a still further object of my invention to provide products including a clean copper surface with an oxidation inhibiting layer thereon.

In accordance with my invention, a clean copper surface with an oxidation inhibiting layer thereon is formed by contacting a clean copper surface with a fluid having a high heat of absorption and not subject to auto-oxidation. These and various other objects, features and advantages of the invention will be better understood from the following description taken in connection with the accompanying drawings in which:

FIGURE 3 is a sectional view of a modified apparatus for inhibiting oxygen uptake of clean copper surfaces in accordance with my invention;

FIGURE 4 is a perspective view of another composite article embodying my invention; and FIGURE 5 is a sectional view of an electrically conductive wire with an oxidation inhibited layer and an outer polymeric layer of insulation thereon.

Figure 1:
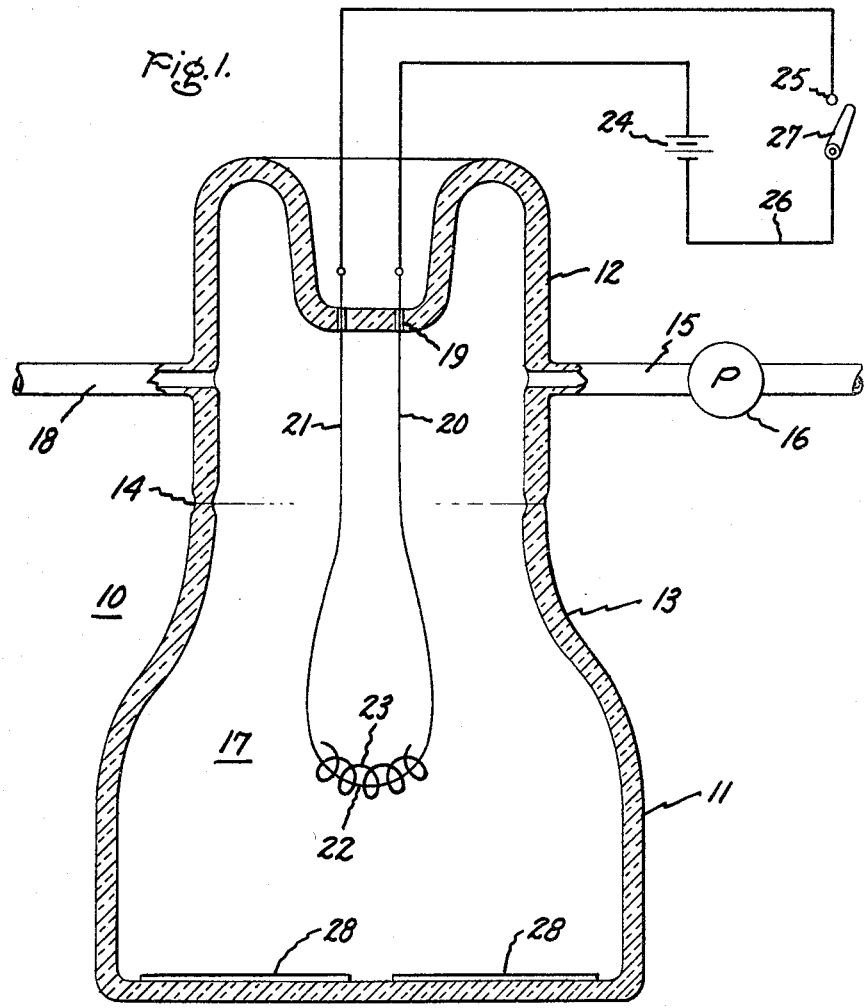
FIGURE 1 is a sectional view of an apparatus for inhibiting oxygen uptake of clean copper surfaces in accordance with my invention.

In FIGURE 1 of the drawing, apparatus is shown generally at 10 for inhibiting oxygen uptake of clean copper surfaces in accordance with my invention. A glass container 11 has an upper portion 12 and a lower portion 13 which are sealed together at 14. A glass evacuation line 15 is sealed to upper portion 12 and is regulated by a pump 16 to evacuate a chamber 17 defined by container 11. A glass gas inlet 18 is sealed to upper portion 12 and is regulated by a valve (not shown). Line 18 is connected to gas sources (not shown) such as oxygen, nitric oxide, nitrosyl chloride, and gaseous nitropropane. Additional valves (not shown) are also employed for the individual sources to regulate the amount of the gas which is fed to inlet line 18.

A pair of glass-to-metal seals 19 in the upper surface of upper portion 12 position a pair of tungsten leads 20 and 21 which extend through such upper surface into chamber 17 and terminate in a loop 22. A coil 23 of a metal, such as copper, which is adapted to be melted by heating loop 22, is shown wound around the loop. Lead 20 extends outwardly from container 11 through seal 19 and is connected to the positive terminal of a variable DC electrical power supply 24. Lead 21 extends outwardly from container 11 through seal 19 to a terminal 25. A lead 26 connects the negative terminal of power supply 24 to a switch 27 which is adapted to contact terminal 25 of lead 21.

A pair of copper foils 28 are shown positioned on the interior bottom surface of lower portion 13 of container 11. Substrates of other material, both metallic and non-metallic are also employed in the same manner.

Figure 2:
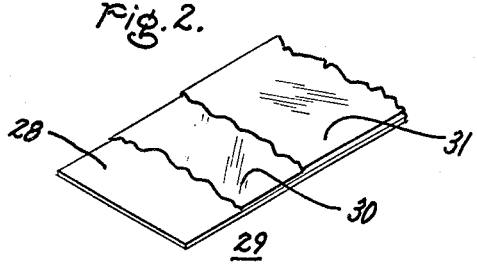
FIGURE 2 is a perspective view of a composite article embodying my invention.

In FIGURE 2 of the drawing, there is shown a composite article 29 which comprises a copper foil 28 as is disclosed in FIGURE 1 of the drawing. A clean copper film 30 is shown adhering to the upper surface of foil 28. An oxidation inhibited layer 31 is shown on the upper surface of the copper film 30. The copper film 30 and layer 31 are formed by employing the apparatus shown in FIGURE 1 of the drawing.

I discovered unexpectedly that the oxygen uptake of a clean copper surface could be inhibited by contacting such a surface with a fluid having a high heat of absorption and not subject to auto-oxidation. A clean surface is a surface which has not been exposed to oxidation or such a surface on which the oxidation products have been removed. For example, such an initial clean surface is produced by vacuum deposition of copper from a copper coil under vacuum conditions. A subsequent clean surface is provided, for example, by the drawing of copper wire through dies.

I found that a variety of fluids can be employed in my method. Such suitable fluids, which must have a high heat of absorption and are not subject to auto-oxidation, include nitrosobenzene, nitrosyl chloride, and nitropropane.

I found further that contacting such a clean copper surface with a fluid of the above type resulted in the formation of an oxidation inhibiting layer thereon which remains effective at elevated temperatures. I found that the copper surface could be employed in a variety of forms such as a film or a core. I found also that a subsequent electrically insulating layer can be provided over the oxidation inhibiting layer, which insulating layer is formed from a wide variety of materials including various enamels and polymeric coatings.

I found also that a unique product resulted from my invention which included a clean copper surface, and an oxidation inhibiting layer thereon. Further, the copper surface can take various forms including a film or core which can be electrically insulated subsequently. In this manner, an insulated product is formed wherein oxygen uptake is inhibited. Further, the electrically insulated product, for example in the form of a copper wire, is protected further at elevated temperatures from separation of the insulated layer from the copper core and from oxidation of the core.

In the operation of apparatus 10 shown in FIGURE 1 of the drawing, a pair of copper foils 28 were positioned on the interior surface of the lower portion 13 of glass container 12 prior to portions 12 and 13 being sealed together at 14. Pump 16 evacuated chamber 17 through line 17 to a pressure of about $10^{-6}$ mm. of mercury. Apparatus 10 is then placed in a furnace (not shown) and heated to a temperature of about 400° C. for a period of about 24 hours to bakeout container 11. After this period of time the pressure in container 11 will be lowered to $10^{-8}$ mm. of mercury. The furnace was removed and container 11 cooled to room temperature.

Switch 27 was closed by contacting terminal 25 thereby providing a current through leads 20 and 21 to heat its loop portion 22. Copper coil 23 was melted by the heating of loop 22 whereupon a copper film was deposited on the upper surface of each of the copper foils 28. In this manner, a clean copper surface was provided on the foils. Switch 27 was then opened.

A valve (not shown) was opened to admit an oxygen inhibiting gas, such as nitrosyl chloride, at an initial pressure of about 60 microns. The valve was then closed. The inhibitor gas was maintained in contact with the clean copper surface for a suitable period of time which can vary widely, for example, from 10 minutes to 24 hours. At the end of this time period, the chamber was reevacuated and then pure oxygen at an initial pressure of about 60 microns was admitted through line 18 by opening its respective valve. This valve was then closed. Pressure changes were monitored with calibrated thermistor gauges. There was no initial instantaneous oxygen uptake. After three minutes, no subsequent oxygen uptake occurred. The temperature was raised to 100° C. for a period of time which was followed by a subsequent temperature of 150° C. The pressure remained constant. Thus, in a plot pressure versus time for the oxygen atmosphere present, both beginning and end of the slope was zero. An X-ray product analysis of the coated foil revealed that there had been no initial instantaneous oxygen uptake or subsequent continuous oxygen uptake. Mass spectrometric analysis indicated the gas phase to consist solely of oxygen.

In FIGURE 3 of the drawings, a modified apparatus is shown generally for inhibiting oxygen uptake of clean copper surfaces in accordance with my invention. A metal base 32 has a raised center portion 33 with apertures 34 and 35 therein and an outer rim 36 on which is positioned a rubber gasket 37. A glass bell jar 38 is positioned on gasket 37 adjacent the edge of center portion 33 of base 32. An evacuation line 39 is positioned in aperture 34 and is regulated by a pump 40 to evacuate a chamber 41 defined by bell jar 38 and center portion 33 of base 32. A gas inlet line 42 is positioned in aperture 35 and is regulated by a valve 43. Line 42 is connected to gas sources (not shown) such as oxygen, nitric oxide, gaseous nitropropane and nitrosyl chloride. Additional valves (not shown) are also employed for the various sources to regulate the amount of the gas which is fed to inlet line 42.

An electrically insulating sleeve 44 is provided in upper center portion of bell jar 38 for extending into and positioning a pair of leads 45 and 46 within chamber 41. A heating coil 47 is formed within chamber 41 from leads 45 and 46. A rod 48 of a metal, such as nickel, which is adapted to be melted by heating coil 47 is shown contained within the coil. Lead 45 extends outwardly from bell jar 38 through sleeve 44 and is connected to the positive terminal of a variable DC electrical power supply 49. Lead 46 extends outwardly from bell jar 38 through insulating sleeve 44 to a terminal 50. A lead 51 connects the negative terminal of power supply 49 to a switch 52 which is adapted to contact terminal 50 of lead 46.

A pedestal 53 is mounted on the upper surface of the center portion 33 of metal base 32. A heater 54 is supported on pedestal 53 to provide heat for a glass substrate 55 shown positioned on the upper surface of heater 54. Substrates of other material, both metallic and non-metallic are also supported on pedestal 53 in the same manner. Heater 54 is shown as being of quartz, mica or Vycor, which has a heating element 56 in the form of a filament extending therethrough. A lead 57, which is connected to one end of filament 56, has a terminal 58 which is adapted to be contacted by a switch 59. A lead 60 is connected from a variable transformer 61 to switch 59. A second lead 62, which is connected to the opposite end of filament 56, is connected to variable transformer 61 and grounded at 63. Transformer 61, which is connected to a 115 volt, AC current supply, provides a 0–40 volt, 0–5 ampere range power source to heat filament 56 in heater 54. Leads 57 and 62 extend through center portion 33 of metal base 32 by means of electrically insulating sleeves 64.

In FIGURE 4 of the drawing, there is shown a modified composite article 65 which comprises a substrate 55 of glass as is disclosed in FIGURE 3 of the drawing. A clean copper film 66 is shown adhering to one surface of substrate 55. An oxidation inhibited layer 67 is shown on the surface of the copper film 66. The copper film 66 and surface 67 are formed by employing the apparatus shown in FIGURE 3 of the drawing.

In FIGURE 5 of the drawing, there is shown a section view of a copper core 68 which has an oxidation inhibited layer 69 thereon and an outer layer 70 of insulation.

In operation of the apparatus shown in FIGURE 3 of the drawing, a substrate 55 of glass is positioned on the upper surface of heater 54 which has a heating filament 56 imbedded therein. A rod 48 of copper is positioned within coil 47. Bell jar 38 is positioned on rubber gasket 37 and its inner edge is adjacent to center portion 33 of base member 32. Pump 40 evacuates chamber 41 through line 39 to a pressure in the range of $10^{-6}$ mm. of mercury. Switch 52 is closed by contacting terminal 50 thereby providing a current through leads 45 and 46 to heat coil 47. Copper rod 48 positioned within coil 47 is thereupon melted and deposited upon the upper surface of substrate 55 in the form of a film which has a clean surface. Upon obtaining the desired thickness of the copper film, switch 52 is opened.

Valve 43 is then opened to admit an oxygen inhibiting gas, such as nitrosyl chloride, at an initial pressure of about 60 microns. Valve 43 is then closed. The inhibitor gas is maintained in contact with the clean copper surface for a suitable period of time, for example, from ten minutes to twenty-four hours.

At the end of the above time period, pump 40 evacuates chamber 41 to its initial pressure of about $10^{-6}$ mm. of mercury. Pure oxygen at an initial pressure of about 60 microns is admitted through line 42 by opening valve 43. This valve is then closed. Pressure changes are monitored with calibrated thermistor gauges.

The oxygen is maintained in contact with the oxygen uptake inhibited copper surface at a temperature of 26° C. for a period of time, during which the oxygen uptake is monitored. Heater 54 is used so that substrate 55 can be maintained at particular elevated temperature levels. The heater is operated by contacting terminal 58 with switch 59 after the voltage has been selected for the desired temperature. The temperature is maintained at temperatures of 100° C. and 150° C. There is substantially no oxidation. Since the pressure is reduced to only $10^{-6}$ mm. of mercury as opposed to the preferred apparatus in FIGURE 1 with a pressure of $10^{-8}$ mm. of mercury, it is not possible to retain copper film 66 as a perfectly clean copper surface.

In FIGURE 4 of the drawing there is shown a composite article comprising a glass substrate 55 with copper film 66 thereon and with an oxygen uptake inhibiting layer 67 on the surface of layer 66. This article is formed in the apparatus of FIGURE 3.

In FIGURE 5 of the drawing there is shown an electrically insulated conductor in the form of a wire which has a copper core 68 with a clean outer surface, and an oxygen uptake inhibiting layer 69 thereon which is formed in the apparatus of FIGURE 3. A layer 70 of electrical insulation is shown on the surface of layer 69. Such a layer is formed by painting a polymeric enamel on surface 69 and subsequently baking at an elevated temperature to cure the enamel thereon. This insulated copper conductor can also be formed in the apparatus of FIGURE 1.

My invention includes further contacting a clean copper surface with a fluid of the above type in liquid state. For example, a copper foil is immersed in liquid nitropropane at room temperature. The surface of the foil is scraped during immersion to provide a clean copper surface. The foil is then air dried. A product results which comprises a clean copper surface with an oxidation inhibiting layer adhering to the surface.

Examples of products including oxidation inhibiting layers embodying my invention, and methods of making such layers and products including such layers in accordance with my invention are set forth below in Examples III–VI.

EXAMPLE I

Apparatus was set up in accordance with FIGURE 1 of the drawing. The pump evacuated the chamber to a pressure of about $10^{-6}$ mm. of mercury. The container or bulb was then placed in a furnace and heated to a temperature of about 400° C. for a period of about 24 hours for bakeout. After this period of time the pressure in the container was lowered to $10^{-8}$ mm. of mercury. The furnace was removed and the container was cooled to room temperature.

The switch was closed by contacting its associated terminal thereby providing a current through the pair of leads to heat its loop portion. The copper coil was melted by the heating of the loop whereupon a copper film was deposited on the inner surface of the glass bulb. In this manner, a clean copper surface was provided. The switch was then opened.

Pure oxygen was admitted to the chamber. There was an initial instantaneous oxygen uptake of about 25 percent of the oxygen after which the pressure was about 60 microns. For a brief induction period of about three minutes after the initial uptake, no further oxygen uptake occurred. The temperature was maintained at 26° C. for 55 hours during which the rate of subsequent continuous oxygen uptake or oxidation was 1.2 microns per minute over the first 15 minutes, during which 23% of the oxygen was taken up. The rate then decreased to 0.08 microns per minute until one hour, when 38% of the oxygen was depleted. The oxygen pressure dropped to zero after 44 hours. In a subsequent test, the oxygen was introduced to a freshly prepared copper surface with the substrate heated and adjusted to maintain a temperature of 100° C. The oxygen was taken up at a rate of 20 microns per minute over the interval 0 to 30 minutes, after which 90% of the oxygen had disappeared. The pressure of the oxygen fell to zero after 3 hours. The temperature was then increased further to 175° C. and a small, fresh supply of oxygen added. This was taken up at a rate of 2.1 microns per minute over the first 15 minutes, with 91% of the oxygen consumed at 15 minutes. The pressure dropped to zero after 3.4 hours.

EXAMPLE II

The same apparatus and procedures as in Example I were followed. After the chamber pressure was lowered to $10^{-8}$ mm. of mercury and the clean copper surface was formed, nitric oxide was admitted to the chamber. The initial NO uptake was to the same extent as observed previously for pure $O_2$. After a period of one hour, the chamber was reevacuated. Pure oxygen was admitted to the chamber at a temperature of 26° C. whereby the pressure was 60 microns. There was no initial instantaneous oxygen uptake or brief induction period. The rate of subsequent continuous oxygen uptake was 0.07 micron per minute over the first 44 hours, with 53 percent of the oxygen taken up in that time.

EXAMPLE III

The same apparatus and procedures as in Example I were followed. Gaseous nitropropane was employed as the oxygen uptake inhibiting gas. There was no initial instantaneous oxygen uptake. Table I shows the rates of subsequent continuous oxidation uptake at various temperatures, and after various time periods.

TABLE I

| Temperature, ° C. | Rate of oxidation, microns/min. | Uptake of oxygen |
|---|---|---|
| 26 | 0 | 0 after 44 hours. |
| 100 | 0 | 0 after 26 hours. |
| 125 | 0.003 | 16% after 45 hours. |
| 150 | 0.01 | 12% after 8 hours. |

EXAMPLE IV

The same apparatus and procedures as in Example I were followed. Gaseous nitrosyl chloride was employed as the oxygen uptake inhibiting gas. There was no initial instantaneous oxygen uptake. Table II shows the rates of subsequent continuous oxidation uptake at various temperatures, and after various time periods.

TABLE II

| Temperature, ° C. | Rate of oxidation, microns/min. | Uptake of oxygen |
|---|---|---|
| 26 | 0 | 0 after 24 hours. |
| 100 | ¹ 0.005 | 10% after 95 hours. |
| 125 | 0 | 0 after 24 hours. |
| 150 | ¹ 0.002 | 4.2% after 18 hours. |
| 175 | 0.005 | 19% after 24 hours. |
| 200 | ¹ 0.006 | 28% after 70.5 hours. |

¹ Average.

EXAMPLE V

A copper foil was fired initially in hydrogen and immersed subsequently in liquid nitropropane at room temperature. One surface of the foil was scraped while immersed to provide a clean copper surface. After the foil was air dried, the scraped and treated surface was coated with Alkanex resin and cured at 300° C. After one hour of aging at 300° C., the resin adhered firmly to the copper surface. After an additional hour of aging, the resin adhered firmly to the copper surface.

EXAMPLE VI

The same procedures as in Example V were followed. After the initial curing, the coated foil was aged at 250° C. for two hours. The coated foil, which was subjected to a bend test, displayed adhesion between the resin and the copper surface.

While other modifications of the invention and variations thereof which may be employed within the scope of the invention have not been described, the invention is intended to include such that may be embraced within the following claims.

What I claim as new and desire to secure by Letters Patent of the United States is:

1. A method comprising (1) providing a copper surface essentially free of oxidation products, and (2) contacting the copper surface of (1) with a fluid selected from the class consisting of nitrosyl chloride, nitropropane and nitrosobenzene, thus forming an oxidation inhibiting layer on the copper surface.

2. A method as in claim 1, in which the fluid is nitrosyl chloride.

3. A method as in claim 1, in which the fluid is nitropropane.

4. A method as in claim 1, in which the fluid is nitrosobenzene.

5. A copper substrate having a surface substantially free of oxidation products and an oxidation inhibiting layer formed by contacting the copper surface with a fluid selected from the class consisting of nitrosyl chloride, nitropropane and nitrosobenzene.

6. A product as in claim 5, in which the fluid is nitrosyl chloride.

7. A product as in claim 5, in which the fluid is nitropropane.

8. A product as in claim 5, in which the fluid is nitrosobenzene.

9. A product as in claim 5, having an electrically insulating polymeric coating adhering to the treated substrate.

References Cited

UNITED STATES PATENTS

| 2,593,922 | 4/1952 | Robinson | 148—6.31 X |
| 2,662,808 | 12/1963 | Newschwander | 106—14 X |
| 3,309,373 | 3/1967 | Danzig | 252—390 X |
| 3,410,703 | 11/1968 | Kroll et al. | 117—127 X |

FOREIGN PATENTS 933,979   8/1963   Great Britain.

ALFRED L. LEAVITT, Primary Examiner

W. E. BALL, Assistant Examiner

U.S. Cl. X.R.

148—6.31, 31.5